United States Patent [19]
Okada et al.

[11] 3,722,615
[45] Mar. 27, 1973

[54] VEHICLE DOOR LOCKING SYSTEM

[75] Inventors: Masashi Okada, Kariya; Yoshichi Kawashima, 16, Kamurocho-2-chome, Gifu; Hisami Mitsueda, Mieken, all of Japan

[73] Assignee: Nippondenso Co., Ltd., Kariya-shi, Japan

[22] Filed: July 19, 1971

[21] Appl. No.: 163,837

[30] Foreign Application Priority Data

Sept. 2, 1970 Japan ...............................45/76890

[52] U.S. Cl. ...............................180/112, 180/105 E
[51] Int. Cl. ...............................B60r 21/00
[58] Field of Search......180/107, 114, 112, 113, 111, 180/82, 105 E; 70/264; 317/5, 148.5

[56] References Cited

UNITED STATES PATENTS

| 3,096,845 | 7/1963 | Oishei et al. | 180/112 |
| 3,141,517 | 7/1964 | Detloff et al. | 180/112 |
| 3,228,490 | 1/1966 | Ackman | 180/112 |
| 3,612,207 | 10/1971 | Cabanes | 180/112 |
| 3,630,305 | 12/1971 | Kazaoka | 180/113 |

*Primary Examiner*—Kenneth H. Betts
*Attorney*—Cushman, Darby & Cushman

[57] ABSTRACT

A system for locking vehicle doors wherein the doors of a vehicle, especially, an automobile are locked or unlocked by the operation of a manual switch in order to prevent theft, for example, and in addition they are automatically locked when the vehicle speed reaches a predetermined level, thereby securing the safety of passengers.

1 Claim, 2 Drawing Figures

VEHICLE DOOR LOCKING SYSTEM

BACKGROUND OF THE INVENTION

1. Field of the Invention

This invention relates to a system for locking vehicle doors, or more in particular, to a system for locking automobile doors wherein the automobile doors are locked or unlocked by the operation of a manual switch in order to prevent theft, and in addition they are automatically locked when the vehicle speed reaches a predetermined level, thereby securing the safety of passengers.

2. Description of the Prior Art

In a conventional door locking and unlocking system wherein the doors are locked or unlocked by the operation of a manual switch and locked automatically when the vehicle speed reaches a predetermined level, currents for locking and unlocking electromagnetic valves are switched on and off by means of a relay, whereby a fluid, including the negative pressure in the intake manifold of a vehicle-loaded engine, is led to a servo system containing a diaphragm by means of the above-mentioned locking and unlocking electromagnetic valves, so that the servo system functions to lock the doors. In this prior art system, the relay used for supplying and cutting off the current to the electromagnetic valves has a short life due to the friction which develops on the contacts thereof. In addition, the opening and closing of the contacts causes an unacceptable noise to automobile passengers. Further, it is difficult, using this system to introduce integrated circuits, and as a result the system as a whole becomes bulky and heavy, limiting the space in which it is mounted and resulting in a high cost system. Another disadvantage of the prior art system in that, due to the delay of the flow of working fluid and delay in the mechanical operation of the locking and unlocking electromagnetic valves and the servo system associated with them, the servo system does not function satisfactorily resulting in inaccurate locking and unlocking operations, especially when the manual switch is opened immediately after it is closed at the locking or unlocking side thereof.

SUMMARY OF THE INVENTION

An object of this invention is to provide a vehicle door locking system including a holding circuit which energizes the locking electromagnetic valve thereby energizing a servo system to lock the doors, while at the same time maintaining the doors locked even after the locking electromagnetic valve is de-energized, and which energizes the unlocking electromagnetic valve thereby energizing another servo system and releasing said holding circuit from the locked condition, wherein said system further comprising two capacitors whose charging paths are opened and closed by closing and opening a manual switch, respectively a locking transistor between a base and an emitter of which one of said capacitors is connected to control the current to a locking electromagnetic valve, an unlocking transistor between a base and an emitter of which the other of said capacitors is connected in order to control the current to an unlocking electromagnetic valve, a discharging circuit for discharging said two capacitors through resistors and the bases and emitters of the corresponding locking and unlocking transistors respectively, and automatic locking circuit for energizing said locking transistor when the vehicle speed reaches a predetermined level, an exclusive circuit for cutting off said unlocking transistor when said locking transistor is conducting, and a protective circuit for cutting off said locking and unlocking transistors by detecting abnormal voltages between the collectors and emitters of said locking and unlocking transistors.

As described above, the door locking system according to the invention comprises two capacitors whose charging paths are opened and closed in response to the closing and opening of a manual switch, a locking transistor with a base and an emitter between which one of the above-mentioned capacitors is connected to regulate the currents to a locking electromagnetic valve, an unlocking transistor with a base and an emitter between which the other of the above-mentioned two capacitors is connected to regulate the current to an unlocking electromagnetic valve, and a discharging circuit for discharging the two capacitors through the bases and emitters of the corresponding locking and unlocking transistors respectively and through resistors. Therefore, it is possible to energize and de-energize the electromagnetic valves contactlessly by the use of the locking and unlocking transistors, whereby the problem of wear of the contacts due to friction is eliminated and the life of the system is greatly extended. In addition, integrated circuits can be introduced very easily, making it possible to mass-produce a small and light system at low cost.

Further, the locking system according to the invention has an advantage that even if the manual switch is opened only a short time after it is closed at the locking or unlocking side for locking or unlocking purpose respectively, the locking and unlocking electromagnetic valves continue to be energized by the discharge current from the capacitors for a period of time determined by the time constant of the capacitors, and therefore locking and unlocking operations are performed accurately even if the locking and unlocking electromagnetic valves and a pressure-responsive system are delayed in energization.

Furthermore, since the locking system according to the invention is provided with an automatic locking circuit which energizes the locking transistor when the vehicle speed reaches a predetermined level, the locking electromagnetic valve is energized and the doors are automatically locked when the vehicle speed exceeds a predetermined level, and they are unlocked when the vehicle speed falls below a certain level, whereby accidents are prevented, in which the doors suddenly open while the vehicle is running, thus greatly contributing to traffic safety.

Still another advantage of the invention is concerned with an exclusive circuit which cuts off the above-mentioned unlocking transistor at the time of energization of the locking transistor. Because of this exclusive circuit, even if the manual switch is erroneously closed at the unlocking side while the doors are in the locked state as the result of energization of the automatic locking circuit, at a vehicle speed higher than the predetermined level, the doors will not be opened by the energization of the unlocking electromagnetic valve, thereby providing a very useful means of securing increased safety.

In addition, the system according to the invention is provided with a protective circuit for cutting off the locking and unlocking transistors whenever it detects an abnormal voltage between the collector and emitter of the locking and/or unlocking transistors, so that, if the collector of the locking and/or unlocking transistors is erroneously connected direct to the positive electrode of a battery or if the locking and unlocking electromagnetic valves which are connected as a collector load are short-circuited, the locking and/or unlocking transistors are immediately cut off, thereby preventing damage to them and providing a complete solution to the problem of lockability and unlockability due to such damage.

DESCRIPTION OF THE PREFERRED EMBODIMENT

Figure 1:
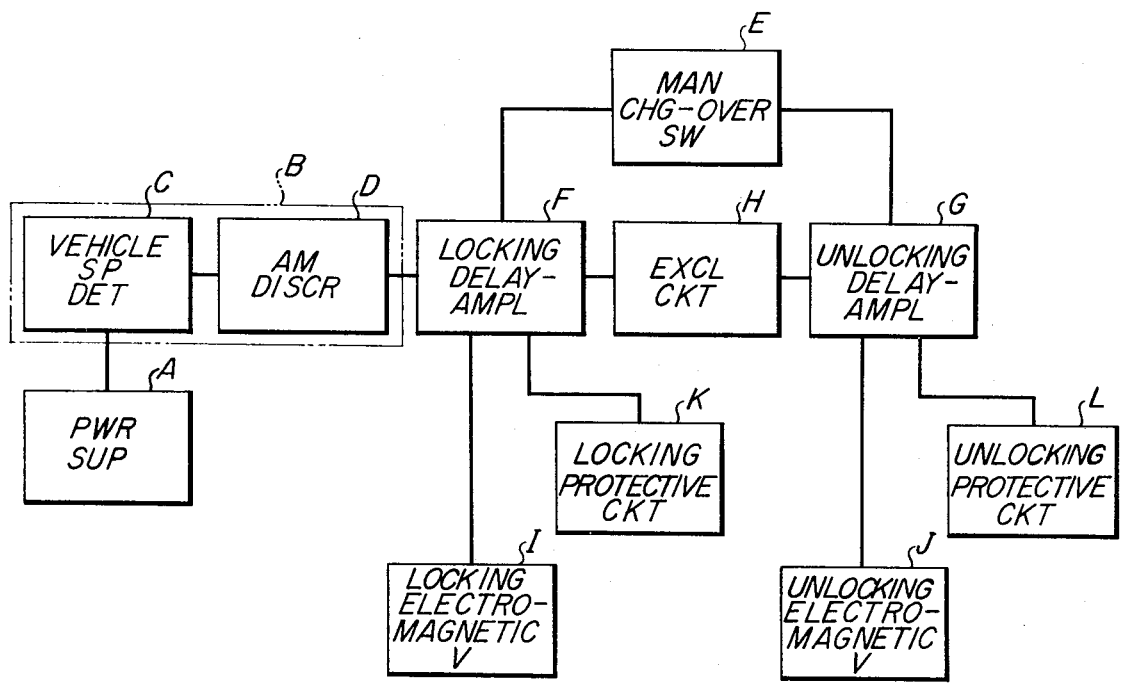
FIG. 1 is a block diagram showing an outline of the construction of an embodiment of the vehicle door locking system according to this invention.
Figure 2:
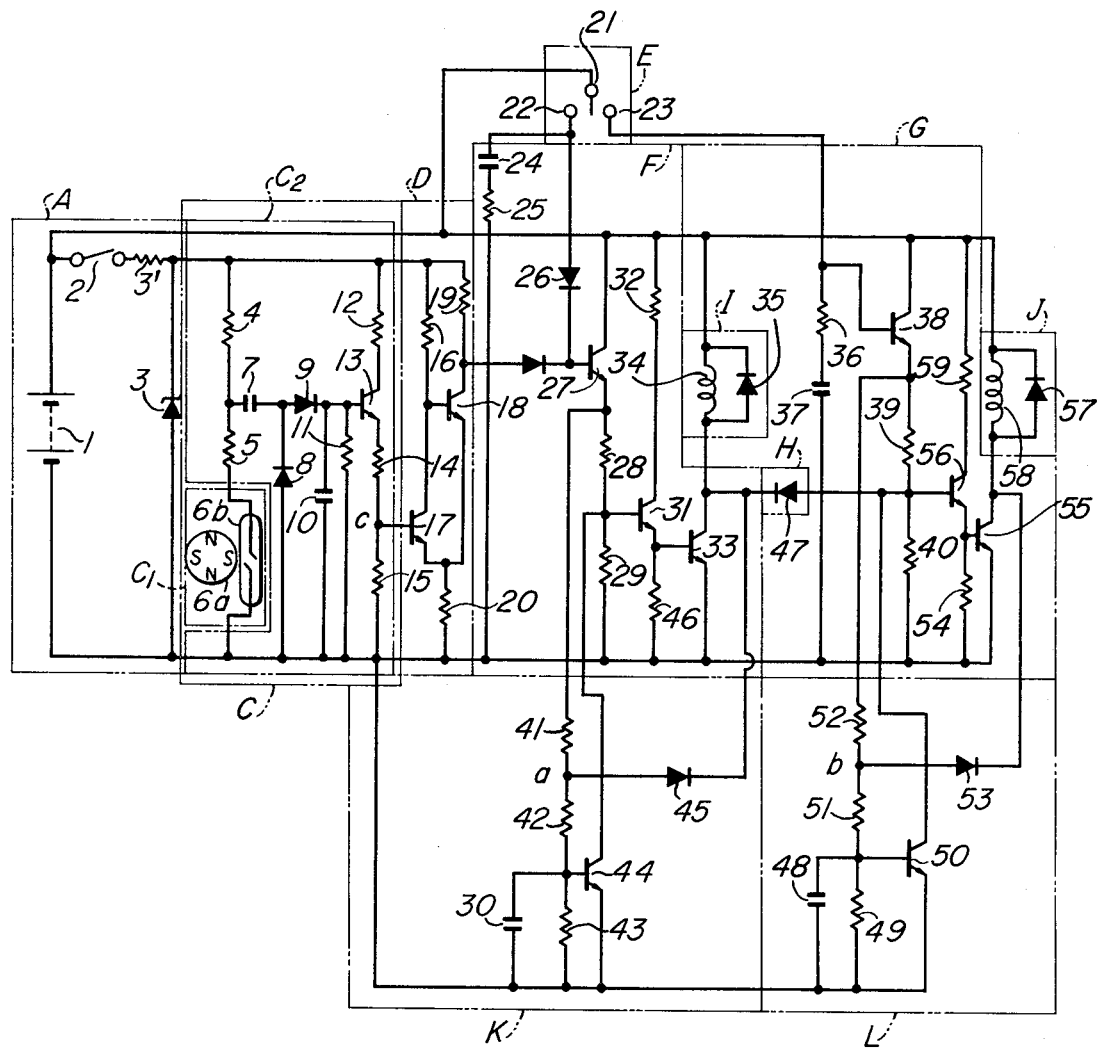
FIG. 2 is a diagram showing an electrical circuit of the embodiment.

An embodiment of the invention will be explained now with reference to the drawings. Referring first to FIG. 1 showing a schematic diagram of the whole construction, the reference character A shows a power supply circuit, and character B an automatic locking circuit which comprises a vehicle speed detector circuit C and an amplitude discriminator circuit D. The reference character E shows a manual change-over switch, character F a locking delay-amplifier circuit, character G an unlocking delay-amplifier circuit, character H an exclusive circuit, charactor I a locking electromagnetic valve, character J an unlocking electromagnetic valve, character K a locking protective circuit and character L an unlocking protective circuit.

The construction and operations of each of the above-described circuits will be now explained. The power supply circuit A comprises a vehicle-loaded source battery 1 of 12V, an ignition key switch 2, a constant voltage diode 3 and a resistor 3'. The vehicle speed detector circuit C comprises a pickup $C_1$ and D-A converter circuit $C_2$, the pickup $C_1$ consisting of a rotor 6a made of a permanent magnet and a reed relay 6b arranged in the vicinity of the periphery of the rotor 6a, the rotor 6a being adapted to rotate by means of, for example, a speedometer cable. The D-A converter circuit $C_2$ comprises resistors 4 and 5, a clipping capacitor 7, diodes 8 and 9, peaking capacitor 10 and a resistor 11 for temperature compensation. The amplitude discriminator circuit D comprises a Schmitt circuit having transistors 17 and 18, collector load resistors 16 and 19, and an emitter resistor 20. The manual change-over switch E comprises a movable contact 21, a lock side contact 22, and an unlock side contact 23. In the locking delay-amplifier circuit F, numeral 24 shows a capacitor which is connected to the lock side contact 22 of the manual change-over switch E through the resistor 25 and also between the base and emitter of the transistor 27. Numerals 28 and 29 show emitter resistors connected with the emitter of the transistor 27 and which combine with the transistor 27 to form an emitter-follower circuit. Numerals 31 and 33 show transistors, numeral 46 a resistor for stabilizing the bias for the transistor 33, and numeral 32 a load resistor for the transistor 31. An exciting coil 34 for the locking electromagnetic valve I is connected as a collector load of the transistor 33. Numeral 35 shows a diode for absorbing the counter electromotive force of the exciting coil 34 the locking electromagnetic valve I applies negative pressure in the intake manifold of the vehicle-loaded engine to a servo system comprising pressure-responsive means such as a diaphragm and a piston only when the exciting coil 34 is energized, so that the servo system functions to mechanically lock the doors. It is also provided with a holding means for maintaining the locked condition even after the locking electromagnetic valve I is de-energized. Referring to the unlocking delay-amplifier circuit G, numeral 37 shows a capacitor which is connected not only to contact 23 on the unlock side of the manual changeover switch E through the resistor 36 but also between the base and emitter of the transistor 38. Numerals 39 and 40 show emitter resistors connected to the emitter of the transistor 38 and combine with the transistor 38 to form an emitter-follower circuit. Numerals 55 and 56 show transistors, numeral 54 a resistor for stabilizing the bias for the transistor 55, and numeral 59 a load resistor for the transistor 56. An exciting coil 58 of the unlocking electromagnetic valve J is connected as a collector load of the transistor 55. Numeral 57 shows a diode for absorbing the counter electromotive force of the exciting coil 58. The unlocking electromagnetic valve J, only when the exciting coil 58 is energized, applies the negative pressure in the intake manifold of the vehicle-loaded engine to a servo system comprising a pressure-responsive means such as a diaphragm and a piston, whereby the servo system is actuated to unlock the doors mechanically. A holding means is also provided which maintains the unlocked condition even after the unlocking electromagnetic valve J is de-energized. The exclusive circuit H comprises a diode 47 having an anode connected to the base of the transistor 56 and a cathode connected to the collector of the transistor 33. In the locking protective circuit K, numerals 41 and 42 show resistors for voltage division, numeral 43 a resistor for stabilizing the bias of the transistor 44, and numeral 30 a delay capacitor inserted between the base and emitter of the transistor 44. The collector of the transistor 33 is connected to the junction point a between the voltage-dividing resistors 41 and 42 through the diode 45. In the unlocking protective circuit L, reference numerals 51 and 52 show resistors for voltage division, numeral 49 a resistor for stabilizing the bias for the transistor 50, and numeral 48 a delay capacitor connected between the base and emitter of the transistor 50. The collector of the transistor 55 is connected through the diode 53 to the junction point b between the voltage-dividing resistors 52 and 51.

The operations of the door locking system according to the invention with the above-described construction will be now explained. Assuming that the movable contact 21 of the manual change-over switch E is closed at the lock side 22 in order to lock the doors and protect a parked car from theft, the capacitor 24 is charged in a very short time by the storage battery 1 through the resistor 25, while at the same time a bias current flows between the base and emitter of each of the transistors 27, 31 and 33, which are thereby made to conduct, energizing the exciting coil 34 of the locking electromagnetic valve I, whereby a negative pressure from a negative pressure source is led to the servo system to lock the doors and the locked state is maintained by the holding means. Now, even if the movable contact 21 of the manual change-over switch E is opened immediately after it is closed at the lock side contact 22, the discharge current of the capacitor 24 continues to flow through the resistor 25, the base and emitter of the transistor 27 and the emitter resistors 28 and 29 because of the electric charges stored in the capacitor 24, and therefore the transistors 27, 31 and 33 are sufficiently biased to maintain their conductive states for a period of time determined by the time constant depending on the capacitance of the capacitor 24, the current amplification factor of the transistor 27 and the resistance values of the emitter resistors 28 and 29, and the voltage $V_{BE}$ between the base and emitter of the transistor 27. By appropriately selecting these values, it is possible to maintain the conductive state of the transistors 27, 31 and 33 for 1.5 to 2 seconds. In this way, even if the movable contact 21 of the manual change-over switch E is opened immediately after being closed at the lock side contact 22, the transistors 27, 31 and 33 continue to conduct for 1.5 to 2 seconds thereby continuing to energize the exciting coil 34 of the locking electromagnetic valve I, so that the holding means functions, without fail, to lock the doors even in the event of a delayed operation of the servo system or the locking electromagnetic valve I.

In unlocking the locked doors, the movable contact 21 of the manual change-over switch E is closed at the unlock side contact 23, whereby the capacitor 37 is charged very quickly by the storage battery 1 through the resistor 36, while at the same time a bias current is passed between the base and emitter of the transistors 38, 56 and 55 thereby to set the transistors 38, 56 and 55 in a conductive state. As a result, the exciting coil 58 of the unlocking electromagnetic valve J is energized so that negative pressure from the negative pressure source is led to a servo system different from the one for locking operations as mentioned above, thereby unlocking the doors. In this case, as in the locking operation, even if the movable contact 21 of the manual change-over switch E is opened immediately after being closed at the unlock side contact 23, discharge current of the capacitor 37 continues to flow through the resistor 36, the base and emitter of the transistor 38 and the emitter resistors 39 and 40, and thereby the transistors 38, 56 and 55 are maintained in a conductive state for another 1.5 to 2 seconds, keeping the exciting coil 58 of the unlocking electromagnetic valve energized, so that even if the movable contact 21 of the manual change-over switch E is opened immediately after being closed at the unlock side contact 23 or even if the operation of any component element is delayed, the servo system performs exact unlocking operation and maintains the unlocked state by means of the holding means even after the exciting coil 58 is de-energized.

Explanation will be made now of the operation of the door locking system according to the invention for automatically locking the doors when the vehicle speed reaches a predetermined level. As the vehicle begins to run, the rotor 6a of the pickup $C_1$ is rotated by means of the speedometer cable at a speed in proportion to the vehicle speed, whereby reed relay 6b opens and closes in response to the vehicle speed and a pulse signal in proportion to the vehicle speed is generated across the reed relay 6b. This pulse signal is applied to the D-A converter circuit $C_2$, which generates a voltage in proportion to the vehicle speed across the capacitor 10 by taking advantage of the charging and discharging of the capacitors 7 and 10. The terminal voltage of the capacitor 10 is applied to the base of the transistor 13 in the output stage, while the voltage across the capacitor 10 appears at the junction point c between the emitter resistors 14 and 15 of the transistor 13. This voltage is applied to the base of the transistor 17 in the input stage of the Schmitt circuit comprising the amplitude discriminator circuit D. When the terminal voltage of the junction point c reaches the threshold level of the Schmitt circuit, the transistor 17 is energized and the transistor 18 cut off. The resistance value of the emitter resistor 20 and the constants of other component elements are so selected that the threshold level of the Schmitt circuit corresponds to a predetermined vehicle speed, say, 20 km/h where the doors are locked. On the other hand, as the vehicle speed decreases, the terminal voltage of the capacitor 10, that is, the voltage at the junction point c, decreases, but due to the hysteresial characteristic of the Schmitt circuit, the transistor 17 is cut off and the transistor 18 restored to a conductive state only when the terminal voltage at the junction point c falls below a certain point corresponding to a vehicle speed of, say, 15 km/h, which is lower than 20 km/h.

When the vehicle speed is 20 km/h or less, the transistor 18 in the output stage of the Schmitt circuit is in a conductive state and therefore the transistors 27, 31 and 33 are in a cut-off state, so that the exciting coil 34 of the locking electromagnetic valve I is not energized, preventing the doors from being locked. Under these conditions, the transistor 44 of the locking protective circuit K is also in a cut-off state.

When the vehicle speed exceeds 20 km/h, by contrast, the transistor 18 in the output stage of the Schmitt circuit comprising the amplitude discriminator circuit D is set in a cut-off state, whereby bias voltages are applied to the transistors 27, 31, 33 and 44. However, the base current of the transistor 44 initially flows into the capacitor 30, and since it takes some time until the terminal voltage of the capacitor 30 reaches a sufficiently high level to cause conduction between the base and the emitter of the transistor 44, the transistors 31 and 33 begin to conduct in advance of the transistor 44, thereby reducing the collector voltage of the transistor 33. Accordingly, the base potential of the transistor 44 rises only by a value equivalent to the sum of a forward voltage drop of the diode 45 and the voltage between the collector and the emitter of the transistor 33 divided by the resistors 42 and 43, and as a result the transistor 44 is in a cut-off state under normal conditions. Conduction of the transistor 33 causes the exciting coil 34 of the locking electromagnetic valve I to be energized, whereby the negative pressure in the intake manifold of the vehicle-loaded engine is led to the servo system, which functions to automatically lock the doors. The locked condition of the doors continues until the vehicle speed falls down below 15 km/h and the transistor 18 of the Schmitt circuit comprising the amplitude discriminator circuit D begins to conduct, cutting off the transistors 27, 31 and 33.

When the collector of the transistor 33, for regulating current to the locking electromagnetic valve I, is connected direct to the positive electrode of the storage battery 1 either erroneously or by a short-circuiting between the ends of the exciting coil 34 of the locking electromagnetic valve I, the transistor 33 may be damaged by an excessive collector current if it is in a conductive state. Because of the excessive collector current, the voltage between the collector and emitter of the transistor 33 increases, while the transistor 18 in the output stage of the Schmitt circuit remains in a cut-off state with its collector voltage raised to a level near the source voltage. As a result, the potential at the junction point between the resistors 42 and 43, namely, the base potential of the transistor 44 rises, whereby the transistor 44 begins to conduct, while forcibly cutting off the transistors 31 and 33, the transistor 33 being thus protected from damage by an excessive collector current, which otherwise might flow in it. Subsequent normal operations are secured by opening the ignition key switch 2 and correctly connecting the collector of the transistor 33. It will be understood from the above description that the transistor 44 of the locking protective circuit K performs switching operations between the transistors 31 and 33 by acting as an AND circuit to which the collector voltage of the transistor 33 and the collector voltage of the transistor 18 in the output stage of the Schmitt circuit are applied.

In like manner, when the collector of the transistor 55, for regulating the current to the unlocking electromagnetic valve J, is directly connected to the positive electrode of the storage battery 1, either erroneously or by a short-circuiting between the ends of the exciting coil 58 of the unlocking electromagnetic valve J, the voltage between the collector and emitter of the transistor 55 rises due to an excessive collector current if it is in a conductive state, with the result that the potential at the junction point between the resistors 51 and 49, namely, the base voltage of the transistor 50 rises, so that the transistor 50 is made to conduct, thereby forcibly cutting off the transistors 55 and 56. Thus, the transistor 55 is protected from damage which otherwise might occur due to an excessive collector current.

When the vehicle is running at a speed higher than a predetermined level and the doors are locked by the energization of the transistor 33 and the exciting coil 34 of the locking electromagnetic valve I, a current which otherwise might flow in the base of transistor 56 flows through the collector and the emitter of the transistor 33 and the diode 47 of the exclusive circuit H, even if the movable contact 21 of the manual change-over switch E is closed at the unlock side contact 23. Therefore, the transistors 55 and 56 are not set in a conductive state, preventing the doors from being unlocked.

As an example of the component elements to perform the above-described operations, the inventors have employed a storage battery 1 of 12V, a constant voltage diode 3 of 9V and 0.25W, resistor 3' of 1 kΩ, resistor 4 of 1 kΩ, resistor 5 of 200Ω, resistor 11 of 100 kΩ, resistors 12, 16 and 19 of 10 kΩ, resistor 14 of 2 kΩ, resistor 15 of 20 kΩ, resistor 20 of 15 kΩ, resistors 25 and 36 of 1 kΩ, resistors 28 and 29 of 1 kΩ, resistors 32 and 46 of 1 kΩ, resistor 41 of 10 kΩ, resistors 42 and 43 of 20 kΩ, resistors 38 and 39 of 1 kΩ, resistors 54 and 59 of 3 kΩ, resistors 51 and 49 of 20 kΩ, resistor 52 of 10 kΩ, diodes 8, 9, 26, 35, 45, 47, 53 and 57 of 1W and a breakdown voltage of 100V, capacitor 7 of 1 μF, capacitor 10 of 10 μF, capacitors 30 and 48 of 0.05 μF, capacitors 24 and 37 of 2 μF, transistors 13, 17, 18, 27, 31, 38, 44, 50 and 56 of $P_c$ 150 mW, and transistors 33 and 55 of $P_c$ 10W and $V_{CBO}$ 100V.

Although different servo systems are used for locking and unlocking purposes respectively in the above-described embodiment, one servo system may be employed for both purposes. Also, instead of the negative pressure utilized as a working fluid for the servo systems in the above-described embodiment, compressed air may be used to produce the same effect.

We claim:

1. A vehicle door locking system comprising a locking electromagnetic valve, a servo system energized upon energization of said locking electromagnetic valve thereby to lock vehicle doors, a holding means for maintaining said vehicle doors locked even after said locking electromagnetic valve is de-energized, and an unlocking electromagnetic valve for energizing said servo system or another servo system thereby to release said vehicle doors from said locked state; said locking system further comprising two capacitors whose charging paths are opened and closed by closing and opening a manual switch respectively, a locking transistor with one of said capacitors operatively connected between the base and the emitter thereof to control current to said locking electromagnetic valve, an unlocking transistor with the other of said capacitors operatively connected between the base and the emitter thereof in order to control current to said unlocking electromagnetic valve, a discharging circuit for discharging said two capacitors each through a resistor and the base and the emitter of a corresponding one of said locking and unlocking transistors, an automatic locking circuit for energizing said locking transistor when the vehicle speed reaches a predetermined level, an exclusive circuit for cutting off said unlocking transistor when said locking transistor is in a conductive state, and a protective circuit for cutting off said locking and unlocking transistors by detecting an abnormal voltage between the collector and the emitter of said locking and unlocking transistors.

* * * * *